May 20, 1952 J. W. MARCHETTI 2,597,013

PULSE MODULATOR CIRCUIT

Filed March 3, 1943 2 SHEETS—SHEET 1

INVENTOR
JOHN W. MARCHETTI
BY William D. Hall
ATTORNEY

May 20, 1952 — J. W. MARCHETTI — 2,597,013

PULSE MODULATOR CIRCUIT

Filed March 3, 1943 — 2 SHEETS—SHEET 2

INVENTOR
JOHN W. MARCHETTI
BY William D. Hall
ATTORNEY

Patented May 20, 1952

2,597,013

UNITED STATES PATENT OFFICE 2,597,013

PULSE MODULATOR CIRCUIT

John W. Marchetti, Long Branch, N. J., assignor to the United States of America as represented by the Secretary of War Application March 3, 1943, Serial No. 477,782

25 Claims. (Cl. 250—17)

Figure 1:
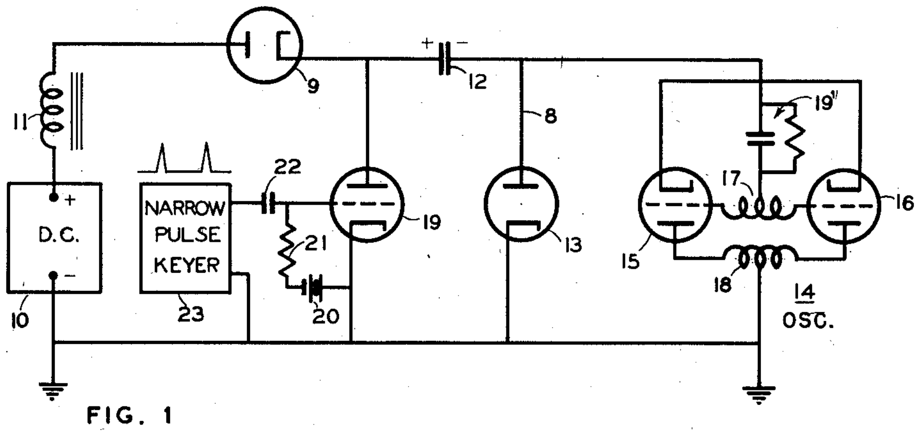

(Granted under the act of March 3, 1883, as amended April 30, 1928; 370 O. G. 757)

The invention described herein may be manufactured and used by or for the Government for governmental purposes, without the payment to me of any royalty thereon.

This invention relates to voltage and power transforming networks; particularly such networks as are suitable for modulating a radio transmitter for both communication and object detection systems.

It has been customary with systems of the latter type to use an oscillator which is normally biased to cutoff, and then producing high frequency pulses by applying pulses of high positive potential to the grids or plates of the oscillator to render the latter operative for the duration of each high potential pulse.

For this purpose the pulse modulator must be capable of supplying high peak power, especially when plate keying is used, since power is drawn by the oscillator when the tube electrodes are driven positive. To keep the average power dissipation of the modulator relatively low, it has been necessary to use power modulators in which no phase inversion occurs so that power will be drawn only for the pulse duration. For this purpose the output stage of one type of known modulator uses a non-degenerative cathode follower circuit with transformer input to the grid circuit of the modulator.

Use of such transformers is, however, difficult where high power modulators are concerned, since considerable grid dissipation occurs in such modulators, requiring such transformers to be able to handle such dissipation. On the other hand transformers capable of handling such power are not ordinarily suitable for transmitting the narrow pulses involved. Prior art design of such transformers therefore involved a compromise between power handling capacity and pulse width.

Another difficulty with prior art methods resides in the necessity for a power source having a time constant small enough to follow a narrow pulse. Where high power is involved this necessitates special and expensive design of such power sources.

It is therefore an object of this invention to provide a high power modulating system which has the desirable characteristics above mentioned without the difficulties experienced with the prior art methods.

It is a further object of this invention to provide a modulation network which yields high enough peak power even for plate circuit modulation of a transmitter without use of pulse transformers. This permits high power modulation by means of narrow pulses and the use of circuits which provide smooth control of pulse width.

It is a further object of the invention to provide a circuit capable of delivering spaced pulses of short duration and high peak power while using a power source having a relatively low time constant and delivering relatively low average power.

It is a further object of the invention to provide a modulator circuit which inverts the pulse and therefore permits use of a power source having its negative pole grounded in conjunction with a transmitter, or other type of load, which has its plate or grid circuit grounded. This feature permits use of a transmitter with its load circuit grounded.

It is a further object of the invention to provide a circuit for transforming the output of a low voltage high current D. C. source into a high voltage low current source.

In accordance with this invention a condenser is alternately charged from a D. C. power source and then discharged through a load circuit, such as the plate circuit of a radio transmitter. Under the control of a periodically conducting electronic switch arrangement the charging is done over relatively long intervals, thus permitting use of a power source having a long time constant. The condenser is discharged through the load circuit, which has a short time constant so that sharp pulses of power can be delivered. According to another feature of the invention, the charge of the condenser is accomplished by means of a rapidly collapsing magnetic field so that the condenser is charged to a voltage higher than the power source. A separate electronic switching arrangement which conducts over relatively long intervals is used to build up a sufficiently large magnetic field.

For a better understanding of the invention, together with other and further objects thereof, reference is had to the following description, taken in connection with the accompanying drawings, and its scope will be pointed out in the appended claims.

In the drawings, Figures 1 through 5 are schematic circuits of different embodiments of the invention, like components in the various figures being indicated by like reference numerals.

Referring now more particularly to Figure 1 of the drawings, a source of direct current voltage 10, which may be a high voltage generator or a rectified A. C. source, is connected on its positive side to one side of a condenser 12 through an iron core choke coil 11 and a diode 9. The other side of said condenser is connected to the anode of a diode 13, the cathode of which is connected to the grounded negative terminal of source 10. Connected in parallel with diode 13 is a load, which, in this case, is a conventional push-pull oscillator 14 having triodes 15 and 16, grid tuning impedance 17, plate tuning impedance 18, and a grid leak and condenser network 19'. It will be seen that the anodes of said oscillator tubes are connected to ground so that the conducting paths of the oscillator tubes are opposite in direction to the conducting path of diode 13. A triode 19 has its anode connected to the junction of diode 9 and condenser 12, its cathode being grounded. This tube is normally biased to cutoff by a biasing source 20 connected to the grid of the tube through a high resistance 21. The grid is also connected through a blocking condenser 22, of low impedance to the pulse energy, to keyer 23 which delivers a series of sharp pulses of short duration spaced at intervals which are relatively long with respect to the duration of the pulse. The keyer is a conventional pulse generator which may have a pulse frequency of the order of 60 to 10,000 cycles. One type of pulse generator that may be used for this purpose is described and claimed in the copending application of James R. Moore, Serial No. 467,265, filed November 28, 1942 now Patent Number 2,510,129 issued June 6, 1950.

Referring now to the operation of the above described circuit, let it be assumed that triode 19 is non-conducting. A current will flow from the positive terminal of source 10, through choke 11 and diode 9, to condenser 12, and back to the negative terminal of said source through the anode-cathode path of blocking diode 13. As a result, condenser 12 will charge to substantially the full voltage of source 10 over a time interval, the length of which is determined by the value of choke 11 and the resistance of the charging circuit. During this charging interval no current can flow through the oscillator tubes 15 and 16 because the connections of said tubes are such that they do not conduct in the charging direction.

When a positive pulse is impressed upon the grid of triode 19, the latter becomes conducting and condenser 12 will suddenly discharge from its positive side through said triode, said oscillator tubes, and back to the negative terminal of said condenser. During said discharge period, the oscillator 14 will be activated and it will generate sustained oscillations. Discharge of condenser 12 through D. C. source 10 is prevented by diode 9. In practice, diode 9 can be omitted because the choke alone offers sufficient impedance to the discharge current, the impedance of the choke circuit being much greater to the sharply rising pulses than the impedance of the discharge path through the oscillator. For the same reason a choke can be substituted for blocking diode 13.

The triode 19 and the controlling keyer 23 function as an electronic switching means for alternately charging condenser 12 in one direction from the power source and then discharging said condenser in the reverse direction through the oscillator. Because of this inversion in polarity, the D. C. source 10 and all circuits up to and including the modulator can have their negative terminals grounded while the load circuit beyond the modulator has its positive terminal grounded.

Furthermore, since the pulses are short and the intervals between pulses are long, the charging of condenser 12 can take place over said long intervals so that a high voltage can be built up across said condenser. Since the condenser discharge circuit through the oscillator does not include choke 11, the time constant of said circuit is low and substantially the entire discharge of the condenser occurs through the oscillator. Thus an average type of high power D. C. source, having a relatively long time constant, can be used to produce sharp pulses of high voltage having large peak power.

Among other advantages of the circuit are the following:

*a.* During intervals between pulses the load circuits of the transmitter are at ground potential resulting in lower insulation requirements.

*b.* During the time the transmitter is not being keyed, there is no voltage impressed upon the output circuits thus providing greater safety to personnel during tune-up periods.

*c.* Power is drawn only for the duration of each pulse thus providing large peak power with relatively low average power.

*d.* Because of the voltage inversion above described, it permits all modulator stages as well as the transmitter load circuit to be operated at ground potential since the inversion takes place beyond the modulator stages. This permits use of resistance coupling in the modulator stages which provide smooth control of pulse width.

*e.* Since the oscillator plates are always at ground potential, it is easier to apply water cooling to the plates. It also makes it possible to use conductive coupling between the load circuit of the oscillator and an external circuit such as an antenna transmission network.

Under certain conditions it is possible to use the circuit in Figure 1 as a direct current voltage booster, i. e. as a means for transforming a low voltage high current source into a high voltage low current source. Neglecting the current drawn by the load circuit 14 and assuming that tube 19 is non-conducting, condenser 12 will be charged to a voltage (V) substantially equal to the voltage (E) of source 10. When a positive pulse renders tube 19 conducting, a current will flow through choke 11, causing a magnetic field to be stored therein, which is equal to $\frac{1}{2} Li^2$; where (L) is the inductance of the choke in henries and ($i$) is the current in the choke in amperes.

When tube 19 is suddenly rendered non-conducting, the magnetic field suddenly collapses and causes a voltage to be induced in said choke in such direction as to charge condenser 12. Because of the sudden collapse of the field the induced voltage can be higher than the existing voltage (V) across the condenser. This causes a charging current to flow into the condenser so that it acquires a high voltage ($V_1$) until an amount of energy equal to $\frac{1}{2} Li^2$ has been transferred; i. e., until $\frac{1}{2} CV_1^2$ equals $\frac{1}{2} CV^2$ plus $\frac{1}{2} Li^2$. Succeeding pulses will further increase the voltage. Between pulses, diode 9 will prevent the charge on the condenser from leaking back to the D. C. source.

The voltage across the condenser can therefore be many times greater than the voltage of source 10. The limitations on the voltage increase are due to the leakage through the distributed capacitance of the choke, and the voltage breakdown points of the components, particularly the diodes.

The above conditions hold when there is no load. When the current drawn by the oscillator 14 is considered, the voltage increase can be maintained only if narrow pulses of current are drawn by the oscillator. On the other hand, since the collapsing field in the choke, which functions to boost the voltage, is built up only during the intervals when the transmitter 14 is pulsed, the energy stored in said field is small if the pulses are of very short duration. This also tends to limit the possible voltage increase.

This difficulty can be avoided by using an additional charging keyer in series with choke 11, which permits the field in said choke to build up over relatively long intervals, said intervals being independent of the pulse width of the oscillator keyer. A method of accomplishing this is shown in Figure 2.

Figure 2:
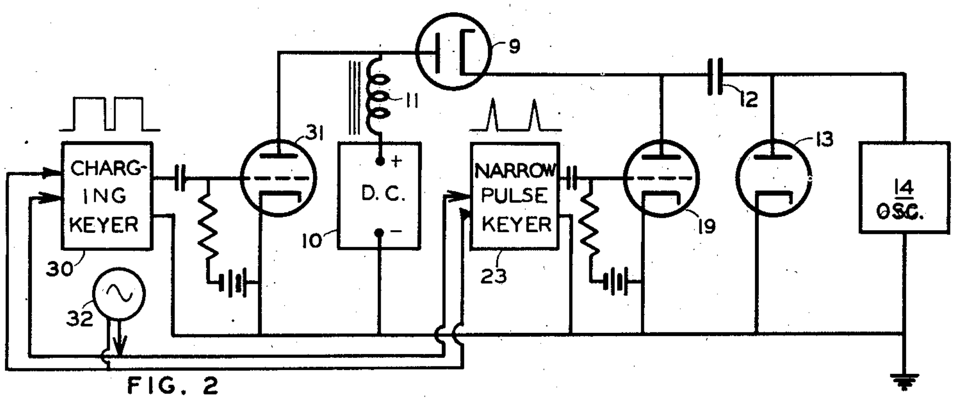

Figure 2 differs from Figure 1 only in the addition of a wide pulse charging keyer 30, which controls a normally blocked modulator tube 31. Keyer 30 is a conventional square wave generator which delivers long positive pulses separated by relatively short intervals. Tube 31 is therefore rendered conducting for long enough intervals to permit the magnetic field in choke 11 to build up to full value. This permits a considerably higher voltage to build up across condenser 12 subject to the amount of power drawn by the oscillator and the other conditions above noted.

Both keyers 23 and 30 can be operated at different frequencies or synchronized at the same frequency. As shown both keyers are controlled by a single audio frequency sine wave generator 32. The manner in which such sine waves are changed to square waves and sharp pulses is well known. It is also disclosed in the Moore application above noted.

Operating both keyers in synchronism provides for simplicity. It is also of advantage if the system is used for object detection by the radio pulse-echo method, wherein a sharp pulse is transmitted at spaced intervals and the reflected echo is detected by a receiver. Both the transmitted and reflected pulses are indicated on the trace of an oscilloscope connected to the receiver output, the distance between said pulses being a function of the distance of the wave-reflecting object. If both keyers are not operated at the same frequency or at harmonic frequencies the charging keyer will cause pulses to continuously drift along the oscilloscope trace.

Since the grids of modulator tube 19, in Figures 1 and 2, and tube 31, in Figure 2, are at intervals driven positive, grid current flows and considerable power is absorbed in the grid circuits. It is therefore important that the grid keyers be capable of supplying sufficient power.

A mathematical treatment of the circuit in Figure 2 will now be given with a specific set of conditions used to illustrate how the values of the different components may be determined.

Let it be assumed that no power is being drawn, i. e. tube 19 is not keyed, so that it remains nonconducting. With charger tube 31 being keyed by a square wave, the current ($i$) in choke 11 during each cycle is given by the equation $$i=(E/R)(1-e-Rt/L) \qquad (1)$$

where (E) is the potential in volts of source 10; ($t$) is the time in seconds during which current flows in the choke; (L) is the inductance in henries of the choke; ($e$) is the base of Naperian logarithms which equals 2.718; and (R) is the sum of the resistances in the circuit including choke 11, the anode cathode resistance of tube 31, and the internal resistance of source 10.

The magnetic energy (W) stored in the choke is equal to ½ $Li^2$. Substituting the value for ($i$) given in equation (1) we get $$W=(\tfrac{1}{2}\,LE^2/R^2)(1-e-Rt/L)^2 \qquad (2)$$

If we let $A$ equal $E^2/2R^2$, and $B$ equal $Rt$, then Equation 2 becomes $$W=AL(1-e^{-B/L})^2 \qquad (3)$$

To derive the value of (L) for maximum energy storage per cycle, the first derivative ($dW/dL$) of Equation 3 is equated at zero. Hence $$dW/dL=0=A\left[(1-e^{-B/L})^2-\frac{2Be^{-B/L}}{L}(1-e^{-B/L})\right] \qquad (4)$$

By factoring, Equation 4 becomes $$A(1-e^{-B/L})\left(1-e^{-B/L}-\frac{2Be^{-B/L}}{L}\right)=0 \qquad (5)$$

Since the product of both factors equals zero, each factor is also equal to zero. Hence $$1-e^{-B/L}=\frac{2Be^{-B/L}}{L}$$

and $$e^{-B/L}=1+2B/L \qquad (6)$$

By the method of successive approximations, $B/L$ is found to be 1.257. Since B is by definition equal to R$t$, Equation 6 becomes $$Rt/L=1.257 \qquad (7)$$

and $$L=Rt/1.257 \qquad (8)$$

Equation 8 represents the relationship of R, L, and $t$ for maximum energy storage per cycle. If we assume that R is 3000 ohms and the charger pulse width is such that the grid of tube 31 is positive for 200 microseconds each cycle, then (L) will be 0.477 henry.

It will be noted that Equation 8 is independent of the pulse frequency of the charging keyer. This is to be expected, since doubling the frequency halves the amount of energy storage per cycle, but doubles the number of charging intervals. The choice of charging frequency is therefore determined by other factors.

One of these factors is the voltage regulation across condenser 12, which is determined by the capacity of said condenser and the charging frequency. If good voltage regulation is desired, the time between charging pulses must not be so long as to permit an appreciable drop in said voltage. From the above equations it also follows that the maximum energy per cycle is inversely proportional to R. To obtain the amount of voltage (V) acquired by the charge on the condenser, the amount of power absorbed by the load circuit, i. e. by oscillator 14 must also be taken into consideration.

For example, assume (R) is 1000 ohms, (E) is 3000 volts, and the pulse width ($t$) is 200 microseconds. The optimum value for $Rt/L$, as given in Equation 7, is 1.257. From Equation 8 the inductance (L) is found to be 0.159 henry. Substituting these values in Equation 2 we get $$W=\tfrac{1}{2}(.159)\left(\frac{3000}{1000}\right)^2(1-e^{-1.257})^2$$

$$W=.3675 \text{ watt per cycle}$$

This represents the maximum energy per cycle stored in the choke and, in the ideal case, this is the amount of energy transferred to the condenser. However, if the transfer efficiency is only 90%, the energy transferred to the condenser per cycle will be 0.331 watt. All this is on the assumption that there is no load.

The effect of the load will now be considered. Let it be assumed that the sharp pulse transmitter keyer 23 is now functioning and that it delivers a triangular pulse 5 microseconds wide at the base. The energy per pulse will be $VA/2\times5\times10^{-6}$; where (V) is the potential in volts on the condenser, and (A) is the peak current in amperes drawn by oscillator 14. If (A) is 15 amperes, then 15 $v./2\times5\times10^{-6}=0.331$. Solving this equation, (V) is found to be 8820 volts, which represents a step-up ratio $(V/E)$ of 2.94.

Figure 3:
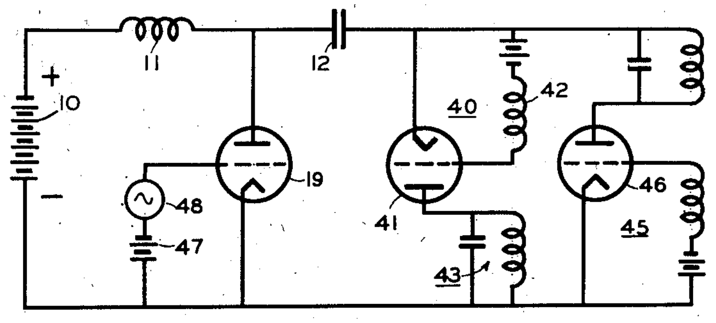

Thus far, the invention has been described as applied to pulse modulation. It can, however, be also applied to continuously variable amplitude modulation, such as voice modulation. One method of accomplishing such modulation is shown in Figure 3. Oscillator 40 includes tube 41, grid tuning coil 42 and plate tuning circuit 43. Oscillator 45 is a duplicate of oscillator 40, but tube 46 is so connected that the flow of current is in the opposite direction to that of the tube 41. Battery 47 is adjusted so that current passes through modulator tube 19 during the entire cycle of applied signal from modulating source 48 and varies accordingly. During one half cycle of the modulator output, current passes through tube 41, which generates high frequency oscillations with amplitudes varying according to the low frequency variation of the modulator output. During the other half cycle of the modulator output tube 46 oscillates in the same manner.

Since no high frequency oscillations exist when no modulating signal is applied to tube 19, this system produces the carrier suppression type of transmission, in which it is necessary to supply the high frequency carrier at the receiving end.

Figure 5:
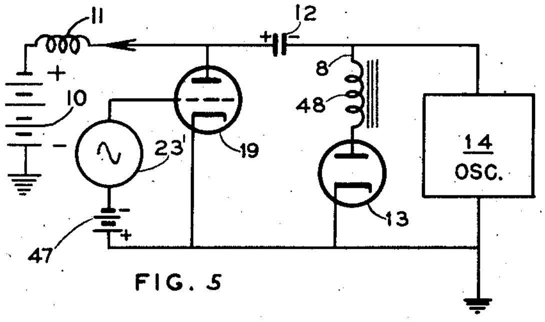

Another circuit for continuously variable amplitude modulation, or interrupted continuous wave modulation, is shown in Figure 5. A choke 48 is inserted in lead 8 in series with diode 13, and in this embodiment, as in the case of that shown in Figure 3, the triode 19 must also be made conducting for the entire cycle of the modulation voltage generated in modulator 23'. This is accomplished by properly biasing the grid of the tube 19 through the battery 47. In all other respects, Figure 5 is similar to Figure 1.

Figure 4:
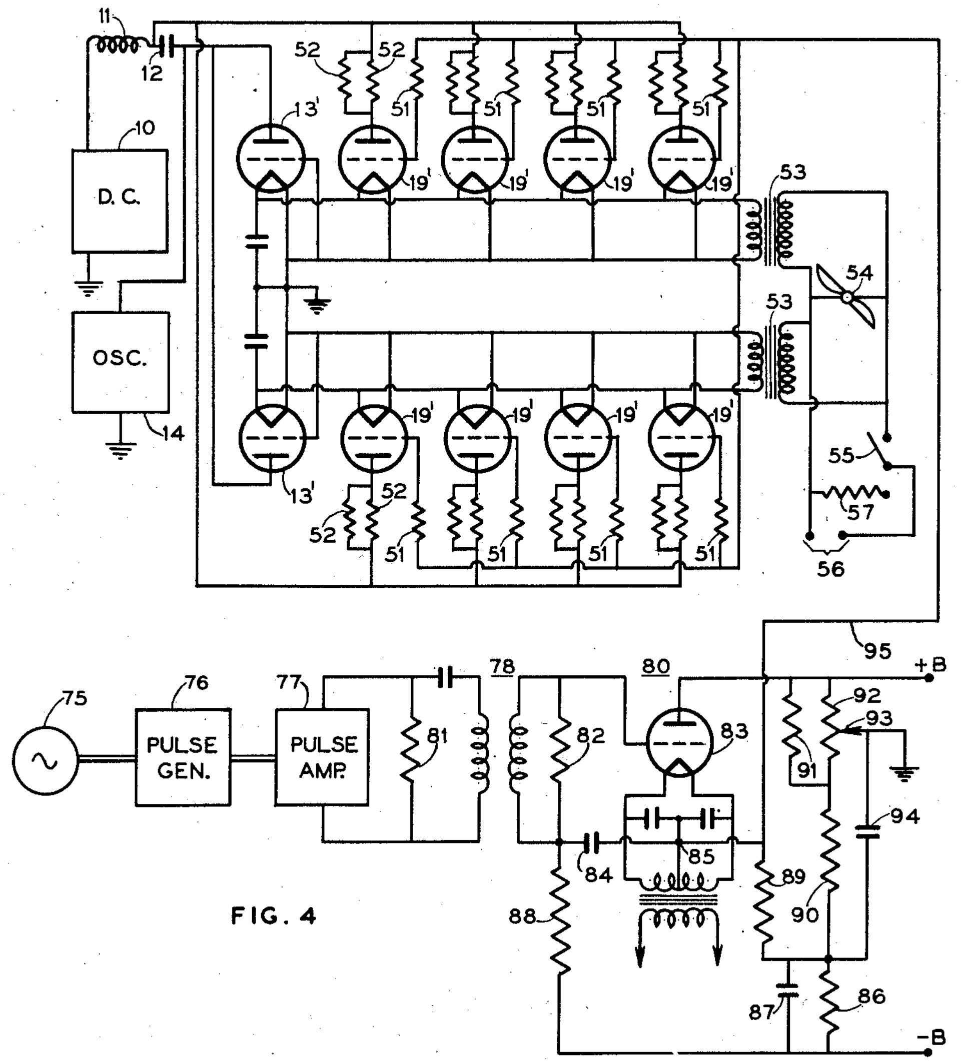

An embodiment of the invention designed to modulate a sixteen tube transmitter is shown in Figure 4. It will be seen that this circuit is similar to Figure 1. No diode such as 9 in Figure 1 is used, the choke 11 being sufficient to prevent discharge of the condenser through the power supply. Tubes 13' may be Eimac type 250TL tubes connected in parallel. Since their grids are connected to the filaments these tubes function as diodes. The pulse keyer output is applied to the grids of eight triodes 19' connected in parallel. Eimac type 304TL tubes may be used for this purpose. Grid current limiting resistors 51 are 40 ohm, 5 watt capacity. Plate current limiting resistors '52 are each 40 ohm, 5 watt resistors. Choke 11 has an inductance of one henry, a resistance of 7.5 ohms, and a current carrying capacity of 0.8 ampere. Condenser 12 has a capacity of 0.25 mf. and is designed to withstand 20,000 volts D. C.

Two filament heating transformers 53 are used. A cooling fan 54 is connected in parallel with the transformer primaries so that it operates to cool the equipment when the latter becomes energized. When switch 55 is opened to remove power from the equipment, it closes a circuit from power terminals 56 through a resistance heater 57, which serves to keep the equipment warm enough to keep moisture out of the components when the latter are not in operation.

As above pointed out, the pulse keyer for controlling modulator tubes 19' must be able to supply sufficient power to the grid circuits of said tubes. The keyer for supplying sufficient power includes a low frequency sine wave oscillator 75 which controls a pulse generator 76 in such manner that at every cycle of oscillator 75, a sharp pulse is generated in generator 76. This type of network is well known, one form being disclosed in the Moore application above noted. The pulse output is amplified in pulse amplifier 77 and applied through a transformer 78 to a power amplifier 80. To provide for transfer of the pulses without distortion, transformer 78 is damped by a 7500 ohm resistor 81, across the primary, and a 50,000 ohm resistor 82 across the secondary. One secondary terminal is connected directly to the grid of triode 83, which may be an Eimac type 304TL. The other secondary terminal is connected to the electrical center 85 of the filament circuit through a one microfarad blocking condenser 84, which has a low impedance to the pulse components. The center point 85 is at the junction of two .01 microfarad condensers, connected in series across the filament. Said condensers also have a low impedance to the pulse components.

The tube 83 is normally kept non-conducting by means of a negative cutoff bias developed across a network consisting of a 7500 ohm resistor 86 and a two microfarad condenser 87. This bias is applied to the grid through a 50,000 ohm resistor 88.

The load resistor 89, having a value of 50,000 ohms, is connected in the cathode circuit. Across the power supply are also connected a 50,000 ohm resistor 90 in series with two parallel connected 10,000 ohm resistors 91 and 92. Resistor 92 has a movable arm 93 connected to ground. A two microfarad condenser 94 is shunted across the variable portion of the resistance network.

The anode-cathode resistance of tube 83, together with resistors 89 through 92, constitute a bridge network, one arm of which is composed of the tube resistance in series with resistance 89, and the other arm composed of resistors 90, 91, and 92, both arms being connected across the power supply terminals which form two conjugate points of the bridge. The other two conjugate points are grounded slider 93 and point 85, to which is connected the output lead 95, which is in turn connected to the grid circuit of the modulator.

Since tube 83 is normally cutoff, no potential drop occurs across cathode load resistor 89. A steady negative bias, the potential of which is determined by the position of slider 93, is impressed upon output lead 95, said bias keeping modulator tubes 19' at cutoff. When a positive pulse is impressed on the grid of tube 83, said tube is rendered highly conducting and the potential across load resistor 89 rises to such an extent that the output of the bridge circuit becomes positive. This positive potential in turn renders modulator tubes 19' conducting so that they operate in the manner described in connection with Figure 1.

To prevent degenerative effects due to the pulse potential across cathode load resistor 89, the time constant of the resistor-condenser network 88—84 is made much larger than the pulse duration.

It will be noted that no phase inversion occurs in amplifier 80. Because of this feature said amplifier delivers high power only during pulse intervals. This enables high peak power to be derived from the tube and at the same time permits the average power dissipation to be low.

A set of component values and tube types have been given to illustrate one typical embodiment of the invention. It should be understood, however, that the invention is not restricted to the component values or tube types given. Other values and tubes may be used if design and operating conditions are changed.

Although the invention has been described as applied to plate modulation of an oscillator, it can also be used for grid modulation or for a combination of both types of modulation.

While the invention has been described with reference to modulating an oscillator, the same expedients can obviously be used for modulating a radio frequency power amplifier fed by a master oscillator. The term transmitter as used in the specification and claims should be construed to mean both such forms of networks.

While there have been described what are at present considered preferred embodiments of the invention, it will be obvious to those skilled in the art that various changes and modifications may be made without departing from the invention, and it is, therefore, aimed in the appended claims to cover all such changes and modifications as fall within the true spirit and scope of the invention.

I claim:

1. In combination with a load circuit, a power source, an inductor having one terminal connected to one pole of said source and its second terminal connected to the anode of a first diode, the cathode of said diode being connected to one side of a condenser, the other side of which is connected to the anode of a second diode and one terminal of said load circuit, the cathode of said second diode and the other terminal of said load circuit being connected to the other pole of said voltage source, and means to intermittently connect the junction of said condenser and the cathode of said first diode to said other pole of said source.

2. In combination with a load circuit, a source of direct current voltage, an inductor having one terminal connected to one pole of said source and its second terminal connected to the anode of a first diode, the cathode of said diode being connected to one side of a condenser, the other side of which is connected to the anode of a second diode and one terminal of said load circuit, the cathode of said second diode and the other terminal of said load circuit being connected to the other pole of said source, and a circuit of variable conductivity connected between said second terminal of said inductor and said other pole of said source.

3. In combination with a load circuit, a source of direct current voltage, an inductor having one terminal connected to one pole of said source and its second terminal connected to the anode of a first diode, the cathode of said diode being connected to one side of a condenser, the other side of which is being connected to the anode of a second diode and one terminal of said load circuit, the cathode of said second diode and the other terminal of said load circuit being connected to the other pole of said source, an electron tube having its anode connected to the second terminal of said inductor and its cathode circuit connected to the other pole of said source, and a source of varying voltage connected between the grid and cathode of said electron tube.

4. In combination with an electron tube transmitter, a source of direct current voltage, an inductor having one terminal connected to one pole of said source and its second terminal connected to one side of a condenser; the other side of said condenser being connected to one terminal of a second inductor and the cathode circuit of said transmitter; an additional electron tube having its anode connected to said one side of said condenser; said other pole of said source being connected to the anode circuit of said transmitter, the cathode circuit of said additional electron tube, and the other terminal of said second inductor; and means to vary the conductivity of said additional electron tube.

5. In combination with a transmitter including an electron tube network, a source of direct current voltage having its negative pole grounded, an inductor having one terminal connected to the positive pole of said source and its second terminal connected to one side of a condenser, the other side of which is connected to the anode of a diode and the cathode circuit of said network, the cathode of said diode and the anode circuit of said network being grounded, a normally blocked electron tube having its anode connected to said one side of said condenser and its cathode circuit grounded, a source of spaced unblocking pulses connected between the grid and cathode of said blocked electron tube, the duration of said pulses being a minor fraction of the intervals therebetween, the time constant of the circuit including the source, the inductor, the condenser, and diode being considerably longer than the time constant of the circuit including the condenser, the anode-cathode circuits of said blocked electron tube and said electron tube network.

6. In combination with a radio transmitter including an electron tube network, a source of direct current voltage, an inductor having one terminal connected to the positive pole of said source and its second terminal connected to the anode of a first diode, the cathode of said diode being connected to one side of a condenser, the other side of which is connected to the anode of a second diode and the cathode circuit of said network, the cathode of said second diode and the anode circuit of said network being connected to the negative terminal of said source, a first normally blocked triode having its anode connected to said one side of said condenser and its cathode circuit connected to said negative terminal, a first source of spaced unblocking pulses connected between the grid and cathode of said triode, the duration of said pulses being less than the intervals therebetween, a second normally blocked triode having its anode connected to said second terminal of said inductor and its cathode circuit connected to the negative terminal of said source, a second source of spaced unblocking pulses connected between the grid and cathode of said second triode, the pulses of said second source being longer than the pulses of said first source.

7. A radio transmitting system comprising a source of direct current voltage having its negative pole grounded, an iron core inductor having one terminal connected to the positive pole of said source and its second terminal connected to the anode of a first diode, the cathode of said diode being connected to one side of a condenser, the other side of which is connected to the anode of a second diode and the cathode circuit an electron tube oscillator, the cathode of said second diode and the anode circuit of said oscillator being grounded, a first normally blocked triode having its anode connected to said one side of said condenser and its cathode circuit grounded, a first source of spaced unblocking pulses connected between the grid and cathode of said triode, the duration of said pulses being a minor fraction of the intervals therebetween, a second normally blocked triode having its anode connected to the second terminal of said inductor and its cathode circuit grounded, a second source of spaced unblocking pulses connected between the grid and cathode of said second triode, the pulses of said second source being considerably longer than the pulses of said first source, and means to synchronize both of said pulse sources, the time constant of the circuit including the source, the inductor, the condenser, and both diodes being considerably longer than the time constant of the circuit including the condenser, and the anode-cathode circuits of said first triode and said oscillator.

8. A radio transmitting system comprising a power source, an inductor having one terminal connected to the positive pole of said power source and its second terminal connected to one side of a condenser, two electron tube radio frequency networks having their anode-cathode circuits connected between the other side of said condenser and the other pole of said source, the anode circuit of one network being connected to the cathode circuit of the other network, an additional electron tube having its anode connected to said one side of said condenser, and its cathode circuit connected to the other pole of said source, and means to modulate the grid circuit of said additional electron tube.

9. An electrical system comprising a direct current power source and a load; an inductance and an electrical energy storage device connected in series, in the order named, between one terminal of said power source and one terminal of said load, the other terminals of said source and said load being connected to a point of fixed reference potential; a charging circuit for said storage device, said circuit including said source, said inductance, and an impedance connected between said point of fixed reference potential and the junction of said storage device and load; and a discharge circuit for said storage device, said discharge circuit including said load and a variable impedance means connected between said point of fixed reference potential and the junction of said inductance and storage device, the time constant of said charging circuit being considerably longer than that of said discharge circuit.

10. An electrical system comprising a direct current power source and a load; a first impedance and an electrical energy storage device connected in series, in the order named, between one terminal of said power source and one terminal of said load, the other terminals of said source and said load being connected to a point of fixed reference potential; a charging circuit for said storage device, said circuit including said source, said impedance and an asymmetrically-conducting means connected between said point of fixed reference potential and the junction of said storage device and load; and a discharge circuit for said storage device, said discharge circuit including said load and a variable impedance means connected between said point of fixed reference potential and the junction of said first impedance and storage device, the impedance of said asymmetrically-conducting means being lower than the impedance of said load for currents in the charging direction, and higher for currents in the discharge direction.

11. An electrical system comprising a direct current power source and a load; a choke coil and condenser connected in series, in the order named, between one terminal of said power source and one terminal of said load, the other terminals of said source and said load being connected to ground; a charging circuit for said condenser, said circuit including said source, said coil, and an impedance connected between ground and the junction of said condenser and load; and a discharge circuit between said storage device and said load, said discharge circuit including said load and switch means connected between ground and the junction of said coil and condenser, said load and said impedance comprising electronic tubes having their respective space-discharge paths oppositely connected.

12. A system as set forth in claim 11, wherein said switch means includes an electron tube normally biased to cutoff, and means to render said tube conducting for short periods spaced at intervals which are considerably longer than said periods, said periods being short compared to the time constant of said charging circuit.

13. An electrical system comprising a power source and a load; an electron tube and an electrical energy storage device connected in series, in the order named, between one terminal of said power source and one terminal of said load, the other terminals of said source and said load being connected to a pint of fixed reference potential; a charging circuit for said storage device, said circuit including said electron tube and an impedance connected between said point of fixed reference potential and the junction of said storage device and load; and a discharge circuit for said storage device, said discharge circuit including said load and a variable impedance means connected between said point of fixed reference potential and the junction of said electron tube and storage device.

14. A system as set forth in claim 13, wherein said variable impedance means includes an electron tube normally biased to cutoff, and means to remove said cutoff for short periods spaced at intervals which are considerably longer than said periods, said periods being short compared to the time constant of said charging circuit.

15. A system as set forth in claim 13, wherein said load and said impedance comprise electron tubes having their respective space-discharge paths oppositely connected.

16. A pulse generator for supplying pulses to a unilateral conducting load circuit, comprising a source of direct current, an inductor, a capacitor connected in series with each other and with said load circuit, switching means for periodically establishing a path for the flow of direct current from said source through said inductor and periodically interrupting said flow of direct current, a unilateral conducting device connected in shunt to said load circuit to provide a path for the flow of current from said inductor to said capacitor upon said interruption of said flow of direct current, and switching means for causing the discharge of said condenser through said load circuit at the instant of substantially complete transfer of the energy from said inductor to said capacitor.

17. A system for producing recurrent pulses of oscillations comprising, an oscillation generator having a cathode and an anode, means connecting said anode to ground, a capacitor having one side connected to said cathode, an inductor having one terminal connected to the other side of said capacitor, a source of direct current voltage having its positive terminal connected to the other terminal of said inductor and its negative terminal grounded, a unidirectional conducting element connected in shunt to the space path of said oscillation generator to permit the flow of current through a charging circuit which comprises said source, said inductor, said capacitor, and said unidirectional conducting element in the direction opposite to that permitted by a discharging circuit which comprises said source, said inductor, said capacitor, and said space path, switching means connected between ground and the point of connection of said capacitor and inductor, and means for cyclically operating said switching means, first to close the circuit between said point and ground to permit the flow of current from said source through said inductor, second to open said circuit to interrupt the flow of current from said source and to cause said capacitor to be charged by the electromagnetic energy of said inductor, and third to close said circuit to cause the discharge of said capacitor through the space path of said oscillation generator.

18. In a system for producing recurrent pulses of oscillations employing an oscillation generator having a cathode and an anode, a circuit for producing recurrent pulses of direct current through the cathode-anode path of said generator to cause the production of oscillations comprising, a direct current source, an inductor, an electric discharge device having a space path, a control electrode therefor and so connected that current from said source may flow through said space path to said inductor, means for periodically varying the voltage of said control electrode to alternately cause said space path to be conductive whereby energy from said source is stored in the magnetic field of said inductor and to block said space path, a capacitor connected in circuit with said inductor whereby the energy stored in the magnetic field of said inductor is transferred to the electrostatic field of said capacitor when said space path is blocked, and switching means for discharging the energy stored in the dielectric field of said capacitor through the anode-cathode path of said generator, said switching means comprising an electron discharge device having a control electrode normally biased to block the space path thereof and means controlled in definite time relation to the blocking of the space path of said electric discharge device for impressing a positive voltage on said control electrode of said electron discharge device to trigger off said electron discharge device.

19. In a system for producing recurrent pulses of oscillations employing an oscillation generator having a cathode and an anode, a circuit for producing recurrent pulses of direct current through the anode-cathode path of said generator comprising a unilateral conductive device connected in shunt with the anode-cathode path of said generator, a source of direct current, an inductor and a capacitor connected in series with each other and the parallel circuit formed by said unilateral conducting device and said anode-cathode path, a charging circuit comprising said source, said inductor, said capacitor, and said unilateral conducting device providing a current path in the direction opposite to that provided by a discharging circuit comprising said source, said inductor, said capacitor, and said anode-cathode path, an electric discharge device having a control electrode and a space path connected to form a path for direct current from said source to said inductor, means for normally biasing said control electrode to block said space path, a source of timing pulses, means for impressing timing pulses from said source on said control electrode to periodically render said space path conductive whereby energy from said direct current source is stored in said inductor during said timing pulses and the energy stored in said inductor is transferred to said capacitor through said unilateral conducting device during the period between said timing pulses, an electron discharge device having a control electrode and a space path connected to provide a conducting path for discharging said capacitor through said anode-cathode path of said generator, means for normally biasing said control electrode of said electron discharge device to block the space path thereof, and means controlled by said timing pulses for triggering off said electron discharge device at substantially the instant of the complete transfer of the energy from said inductor to said capacitor.

20. In combination an electron tube oscillator having an anode and a cathode and adapted when energized by said anode being made positive with respect to said cathode to produce oscillations, a diode having its cathode connected to the anode of said electron tube and having its anode connected to the cathode of said electron tube, a capacitor, an electron discharge device having an anode, a cathode and a discharge control element and being connected in series with said capacitor and the anode-cathode path of said electron tube to form a path for applying a charge on said condenser to said electron tube for causing its operation, means for normally biasing said discharge control element to block the anode-cathode path of said electron discharge device, an inductor connected to form a series circuit with said capacitor and said diode, a source of current, an electric discharge device having an anode, a cathode and a control electrode and connected so that the anode-cathode path forms a series circuit with said inductor and said source of current, means including said control electrode for rendering the anode-cathode path of said electric discharge device conductive to cause the flow of current from said source through said inductor, means for blocking said anode-cathode path to interrupt said flow of current and cause said capacitor to be charged by the energy stored in the magnetic field of said inductor, and means for impulsing the discharge control element of said electron discharge device to discharge said condenser through said electron tube.

21. In a system for transmitting pulses of oscillations, an oscillator having an anode and a cathode, a circuit connected in series with said oscillator for producing recurrent short pulses of direct current for energizing said oscillator for generating the ultra-high frequency oscillations, and a unilateral conducting device connected in shunt to the anode-cathode path of said oscillator to provide a conduction path for said device and said circuit in the direction opposite to that provided by said anode-cathode path and said circuit.

22. In a system for producing pulses of oscillations, an oscillator having an anode and a cathode, a source of short pulses of direct current connected in series with said oscillator for energizing said oscillator, and a unilateral conducting device connected in shunt to the anode-cathode path of said oscillator to provide a conduction path for said device and said source in the direction opposite to that provided by said anode-cathode path and said source.

23. Electrical apparatus comprising electrical energy storage means, a power supply, a load, a first impedance connected between one side of said power supply and one side of said energy storage means, a second impedance connected between the other side of said energy storage means and the other side of said power supply, said load being connected in shunt with said second impedance; a normally open switching means connected between said one side of said energy storage means and said other side of said power supply, said energy storage means transferring energy to said load in response to the closing of said switching means, and said load having a low impedance relative to said second impedance when energy is being transferred thereto.

24. Electrical apparatus in accordance with claim 23, wherein said load is an electron tube oscillator having an anode and a cathode, and wherein said second impedance is a unilateral conducting device, a charging circuit comprising said power supply, said first impedance, said energy storage means and said unilateral conducting device providing a conduction path in the direction opposite to that provided by a discharging circuit comprising said power supply, said first impedance, said energy storage means, and the anode-cathode path of said oscillator.

25. A pulse generator comprising a source of direct current, an inductor, a capacitor, a unidirectional conducting load circuit, a unidirectional conducting device, means connecting said inductor, capacitor, and unidirectional conducting device in series in the order named across said source to form a charging circuit, means connecting said inductor, capacitor, and load circuit in series in the order named across said source to form a discharging circuit, said discharging circuit providing a conduction path for the current of said capacitor in the direction opposite to that provided by said charging circuit, means for periodically causing a current to flow from said source through said inductor to store energy therein, and interrupting said flow of current whereby said energy is transferred to said capacitor through said charging circuit, and means for discharging the energy thus stored in said capacitor through said load circuit.

JOHN W. MARCHETTI.

REFERENCES CITED

The following references are of record in the file of this patent:

UNITED STATES PATENTS

| Number | Name | Date |
|---|---|---|
| 2,085,100 | Knowles | June 29, 1937 |
| 2,139,432 | Andrieu | Dec. 6, 1938 |
| 2,157,929 | Trogner | May 9, 1939 |
| 2,159,493 | Wright | May 23, 1939 |
| 2,173,180 | Peterson | Sept. 19, 1939 |
| 2,244,003 | Eaglesfield | June 3, 1941 |
| 2,276,994 | Milinowski | Mar. 17, 1942 |
| 2,279,007 | Mootley | Apr. 7, 1942 |
| 2,405,070 | Tonks et al. | July 30, 1946 |
| 2,416,718 | Shockley | Mar. 4, 1947 |

OTHER REFERENCES

Instructional Drawings, MIT Radar School, for the SCR-268; Drawing plates 1-Keying Unit and 2-Modulator, dated October, 1942, and 3-Transmitter, dated November, 1942.